Figure 1:
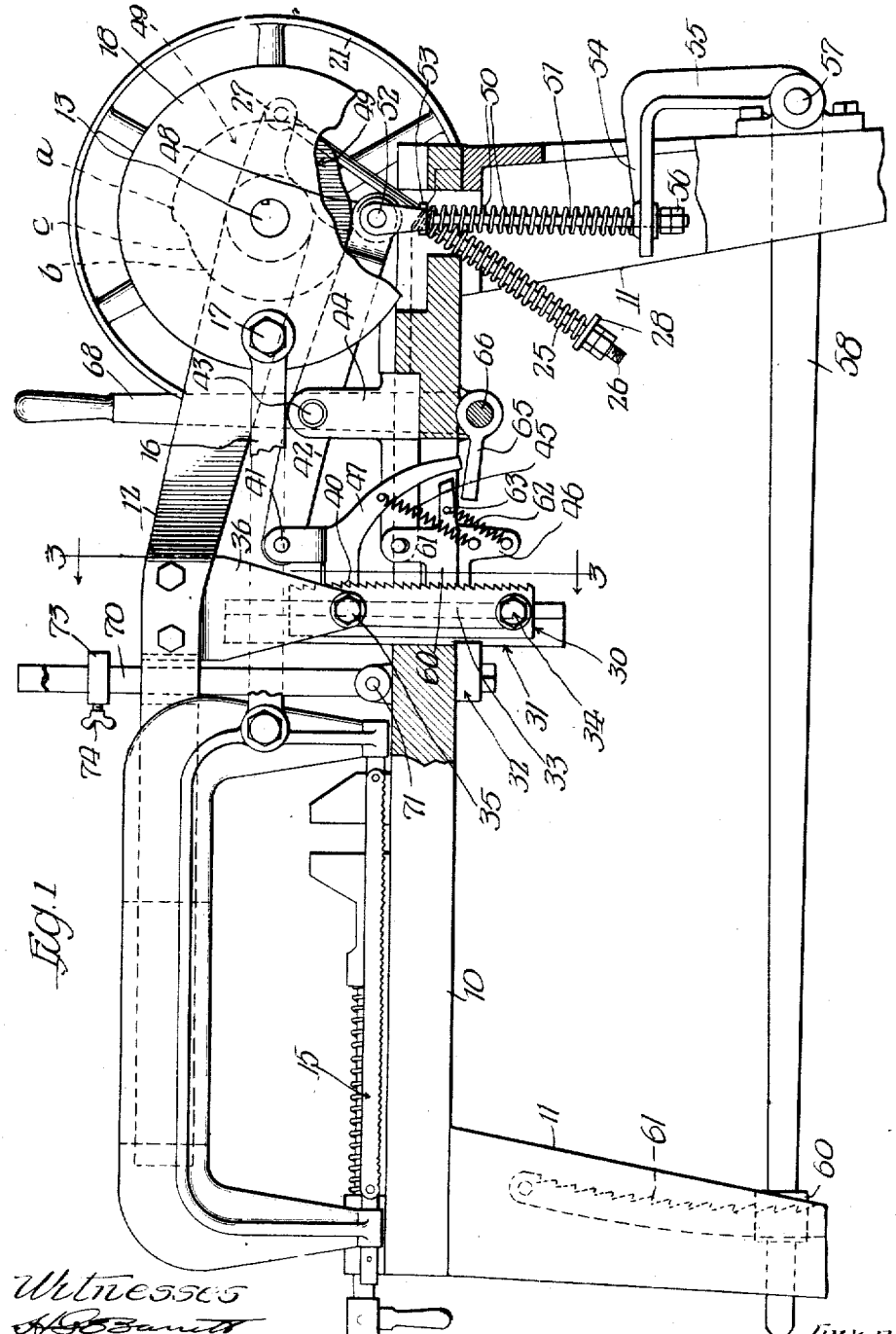

A. RASMUSSEN.
POWER HACKSAW MACHINE.
APPLICATION FILED FEB. 14, 1916.

1,211,964.

Patented Jan. 9, 1917.
2 SHEETS—SHEET 1.

Witnesses
Irene Forrest

Inventor
Andrew Rasmussen
By William H. Hall Atty

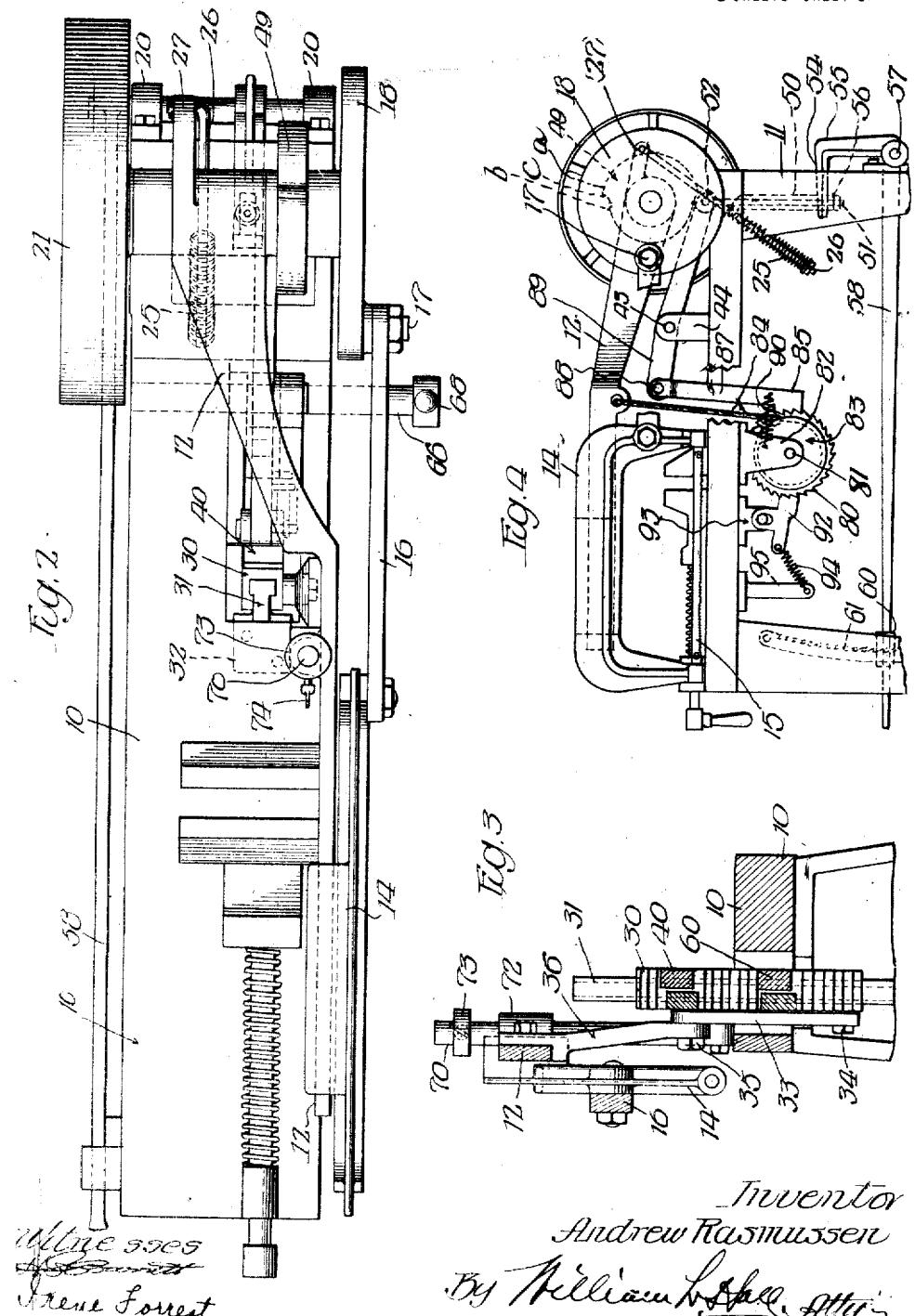

UNITED STATES PATENT OFFICE.

ANDREW RASMUSSEN, OF RACINE, WISCONSIN.

POWER HACKSAW-MACHINE.

1,211,964.     Specification of Letters Patent.     Patented Jan. 9, 1917.

Application filed February 14, 1916. Serial No. 78,148.

*To all whom it may concern:*

Be it known that I, ANDREW RASMUSSEN, a citizen of the United States, and a resident of Racine, in the county of Racine and State of Wisconsin, have invented certain new and useful Improvements in Power Hacksaw-Machines; and I do hereby declare that the following is a full, clear, and exact description thereof, reference being had to the accompanying drawings, and to the characters of reference marked thereon, which form a part of this specification.

This invention relates to improvements in hack saws, and refers more particularly to an improved means to feed the saw blade toward the work during the cutting stroke thereof and to release it from the work during the non-cutting stroke so as to thereby avoid wear thereof and to facilitate the cooling of the saw blade during the non-cutting stroke.

My improvements are herein shown as applied to the type of hack saw illustrated in my prior U. S. Patent No. 1025305, dated May 7th, 1912, wherein the feeding means comprises means independent of the weight of the reciprocating saw frame and its guide for depressing the saw to its work during the cutting stroke.

Among the objects of the present invention are to increase the efficiency of saws of this character by a mechanism which delicately controls the cutting and the non-cutting stroke of the saw so as to avoid an unduly heavy pressure of the saw against its work during its cutting stroke, and to avoid too great a rise of the saw blade from the work during the non-cutting stroke, so that in the subsequent cutting stroke the saw blade will be pressed gently to the work, and without any tendency to break the same when the saw is pressed to the work in the subsequent cutting stroke.

A further object of the invention is to provide, in a sawing machine of this general character, means for raising the saw at the end of its cutting stroke, combined with means for limiting the rising movement of said saw so that upon the next succeeding cutting stroke the saw is required to be depressed but a short distance to its work, thereby avoiding abrupt contact of the saw with the work.

Another object of the invention is to provide means for preventing sudden descent of the saw frame and its guide in the event of the breakage of a saw blade tending to break the guide and frame or other parts of the machine.

Other objects of the invention are to improve and simplify hack saw feed mechanisms, and the invention consists in the combination and arrangement of the parts shown in the drawings and described in the specification and is pointed out in the appended claims.

In the drawings, Figure 1 is a side elevation, with parts shown in section, of a hack saw embodying my improvements. Fig. 2 is a top plan view thereof. Fig. 3 is a vertical section on the line 3—3 of Fig. 1. Fig. 4 is a partial side elevation of a power hack saw, on a smaller scale, showing a modification of the feed means.

A hack saw machine embodying my improvements, so far as its general features of construction are concerned, may follow any preferred type of design. For sake of clearness of the essence of the present invention the elements of the saw structure, aside from the invention, are of a simple construction and design. The frame of the saw consists of a horizontal table 10 having suitably located openings therein for the passage of operative parts of the machine and which is supported on legs, 11, 11.

12 designates a vertically swinging saw frame guide and support that is pivotally mounted at its rear end on the main drive shaft 13 of the machine and supports at its forward end the usual sliding saw frame 14, between the legs of which is stretched a hack saw blade 15.

The reciprocating saw frame 14 is connected by a pitman 16 to a suitable crank actuated by the shaft 13, consisting in this instance of an eccentrically disposed crank pin 17 of a crank disk 18 that is fixed to said shaft 13. Said shaft 13 is mounted in separate bearings 20, 20, which rise from the rear end of the table 10, and the shaft is provided at one end with a belt pulley 21.

The weight of the saw frame and guide will be overbalanced around its pivot 13 so as to tend to raise the saw frame and saw when no feed pressure is exerted thereon, either by means of a weight or spring. As herein shown said overbalancing effect is produced by a spring 25 which surrounds a rod 26 that is loosely connected at one end to a tail piece 27 of the guide 12 and is provided at its other end with a shoulder 28, between which and a downwardly facing surface on the frame 10 said spring 25 is interposed. Said shoulder 28 constitutes part of, or is associated with an adjusting nut which is screw threaded to the rod, whereby the overbalancing pressure of the spring 25 may be delicately adjusted. Obviously a weight suitably applied to the tail piece 27, in the same general manner as shown in my aforesaid prior patent, may effect the same general result, but the spring is preferable, especially in the larger sizes of sawing machines.

The saw is fed toward its work during the cutting stroke thereof, to wit, the rearward stroke of the frame 14, by feed means generally like that shown in my aforesaid prior U. S. Letters Patent, said feed means embracing a ratchet connected to the frame and a feed dog which is controlled by movement derived from the power shaft 13 and acting during the cutting stroke of the saw to draw the saw supporting frame downwardly. The specific form of mechanism shown in Figs. 1, 2 and 3, embraces in general terms, a hollow ratchet bar 30 which is slidable on a T-shaped guide 31 which is attached by a bracket 32 to the machine frame. Said ratchet bar is connected by a link 33 to the saw guiding frame 12, the link 33 being herein shown as loosely connected at its lower end by a pin 34 to the lower end of the ratchet bar and at its upper end by a bolt or pin 35 to an arm 36 which is fixed to and depends from said saw frame supporting guide. Coöperating with the ratchet bar 30 is a feed dog 40 which is provided with teeth to engage the teeth of the ratchet bar. Said feed dog, which is of general L-shape as herein shown, is pivoted at 41 to the forward end of a lever 42, which latter is pivoted at 43 to a standard 44 that rises from the base or bed plate 10 of the machine. The dog 40 may be weighted so as normally to be pressed toward the ratchet bar 30. Preferably, however, a light spring 45 is applied to said dog for this purpose which is attached at one end to a bracket 46 depending from the bed plate, and at its other end to an arm 47 which extends downwardly and rearwardly from the feed dog. The rear end of the lever 42 carries a bearing roller 48 which engages the periphery of a cam 49 that is fixed to and rotates with the shaft 13, or may be otherwise suitably driven therefrom. The periphery of the cam 49 is divided into two equal parts, to wit, a higher part "a" and a lower part "b", connected by oblique or cam portions "c", all as shown in dotted lines in Fig. 1.

The bearing roller 48 carried by the rear end of the lever 42 is normally pressed toward or against the periphery of the cam 49 by means permitting said latter end of the lever to yield backwardly away from the axis of the cam. This may be effected either through the action of a spring or a weight; spring 50 being herein employed as in my aforesaid prior construction. The spring 50 which, in the illustrated embodiment is spiral, surrounds a shaft or rod 51 that is loosely connected at 52 to the rear end of the lever on the axis of the roller 48; said spring being interposed between a shoulder 53 on said rod or shaft 51 and one arm 54 of an L-shaped lever 55 that is perforated for the passage of the rod 51. Said rod 51 is screw threaded at its lower end below said arm 54 to receive a nut or nuts 56 to prevent detachment of the rod from said lever. The lever 55 is pivoted at 57 to the machine frame and is shown as made integral with or fixed to an adjusting lever 58 that extends forwardly from the pivot 57 and is provided with a suitable latch 60 which coöperates with a segmental locking bar 61 fixed to the forward end of the machine.

The lever 58 and its spring connection with the dog carrying lever 42 constitute means for varying the pressure of the saw against the work. When sawing relatively soft metals the spring 50 may be adjusted so as to press the bearing roller 48 of said lever 42 into contact with the lower portion "b" of the cam 49 so as to obtain the maximum cut of the saw. The contact of the roller with this portion of the cam limits the feed movement of the lever in each operation of the saw. When cutting harder metals the spring 50 will be adjusted to press the saw lightly against the work. It will be understood that when the bearing roller is engaged with the higher track of the cam the forward end of the lever 42 is raised so as to release the feed dog from its ratchet bar and permit the saw frame to be raised under the action of the spring 25.

Operating in connection with the feed dog 40 is a stop or check dog 60 which limits the upward swing of the saw frame and guide between the cutting and non-cutting stroke. Said dog is pivoted to a fixed stud 61 on the machine frame below the feed dog and is adapted to be normally held with its teeth engaging with the teeth of the ratchet bar 30 either by gravity or by a spring 62, the latter being preferred. Said spring is connected between the lug 46 and a tail piece 63 on the stop dog. The function of the stop dog is to limit the rising movement of the saw frame during the non-cutting stroke of the saw and at a time when the feed dog is released from the feed ratchet bar so that when said feed dog is again depressed through its feed stroke the teeth thereof engage with teeth of the ratchet bar above those engaged in the earlier feed movements of the dog with the result of positively and progressively feeding the saw to the work during each cutting stroke thereof.

When cutting hard material the feed dog may not be raised at each release thereof from the ratchet to carry it into engagement with the next higher ratchet tooth, but may operate through two or more feed strokes on one ratchet tooth. However, the stop or check dog prevents the rising of the supporting guide under the action of its spring to such height as to cause the ratchet tooth last engaged to pass beyond the dog, such as would occur if the stop dog were not present, so that the feed action on the ratchet bar is a progressive and a positive one. The said check dog is hinged to the machine frame by means preventing lost motion. This may be effected by elongating the aperture therein through which the stud 61 extends. Such lost motion mounting of the stop dog allows slight upward movement of the dog and bar after the stop dog engages the ratchet bar and thereby prevents the latter dog from locking the ratchet bar against upward movement in the event that the lock dog should engage the ratchet teeth in a position favorable for positive locking, as when the abrupt faces of the teeth of the stop dog and ratchet bar were in contact at the time of the release of the feed dog. It will be understood that the rise of the saw blade in the saw cut need not be great, only sufficient to allow complete clearance of the saw blade teeth from the bottom of the saw cut. I have found in practice that sixteen pitch teeth on the ratchet bar are sufficient to produce the desired clearance. If desired the feed and stop dogs may be double, with one member offset from the other as indicated in Fig. 3.

Both the feed and locking dogs may be released from the ratchet bar to permit the saw frame to be raised at the end of a cut by means of an arm 65 carried by a rock shaft 66 which is mounted in suitable bearings carried by the bed plate. Said shaft is provided at one side of the machine with a throw-out lever 68. The arm 65 is located in a position to simultaneously engage both the tail pieces 47 and 62 of said feed and locking dogs, respectively. When the dogs are released the spring 25 raises the saw frame a distance to permit new work to be clamped in the machine for the next cut. The distance which the saw frame is thus raised at ble e  of each cutting operation is preferably l nited to the extent only required by the clearance beneath the saw blade to adjust the work in the holding jaws. A practical form of limiting stop herein shown consists of a bar 70 which is loosely connected at its lower end at 71 to the bed plate and extends upwardly through an apertured enlargement 72 of the swinging supporting guide or frame 12. The said bar is provided at its upper end with a stop collar 73 which is slidable thereon and is adapted to be locked thereto in different positions of vertical adjustment by a thumb screw 74, and engagement of which by the supporting guide limits the upward movement of the saw.

In Fig. 4 I have shown an endless or disk form of feed rack which coöperates with the feed and stop dogs to control the feed movement of the saw. The said disk designated by 80 is mounted to rotate on a shaft 81 which is carried by depending brackets 82 of the machine frame. Rotating with said ratchet wheel and fixed thereto, as herein shown, is a drum 83 on which is adapted to be wound a cable 84, that is attached to the saw frame supporting guide 12. A feed dog 85 engages said ratchet disk, said feed dog being formed on the lower end of a bar 87 which is loosely connected or hinged at 88 to the forward end of the cam controlled feed lever 89. The said dog 85 is shown as normally held against the endless ratchet by a spring 90 connected at one end to the dog and at its other end to one of the brackets 82. In the present instance the stop dog 92 engages the side of the disk remote from the feed dog. Said stop dog is pivoted to a bracket 93 which is attached to and depends from the machine frame and is placed under the action of a spring 94 which is attached at one end to the tail piece of the dog and is attached at its other end to a fixed part 95 which is attached to and depends from the machine frame. The operation of this form of feed device is generally the same as in the construction heretofore described and said feed disk and feed dog are generally like the feed disk and dog shown in my aforesaid prior patent. I have not shown means for simultaneously releasing feed dog and check dog from the disk, but this may be effected in a manner to that similarly illustrated in Fig. 1.

It will be observed that in the event of a breakage of the saw blade, the overbalancing effect of the spring 25 or equivalent means will have the effect to at once raise the forward end of the saw supporting guide, and thereby prevent the guide from dropping downwardly on the bed with such force as would tend to break the same. In certain prior constructions of hack saws it has been common to utilize the weight of the saw frame and its guide, and in some constructions, an additional weight carried by the saw frame. In such prior constructions the full force of this feed weight is carried by the saw blade and, in case of breakage of the blade, said weighted parts, being nonsupported, drop abruptly on the bed with the result that the guide is often broken. It will also be observed that the use of the adjustable device, consisting in this instance of the spring 25 in connection with the locking dog 60, has the effect to delicately balance the saw so that while the saw is lifted clear of the bottom of the saw cut during this non-cutting stroke, the extent of the lift is small. As a result thereof the saw blade is pressed gently against the work in the beginning of the cutting stroke, thereby avoiding such abrupt contact of the saw with the work as would tend to break the saw.

It will be understood that the illustrated embodiment of my invention is capable of some variations within the spirit and scope of the claims hereto appended, and it is the intent to claim all of the inherent novelty shown in the drawings and described in the specification.

I claim as my invention:—

1. Feeding means for power hack saw machines comprising, in combination, a reciprocating saw frame, a vertically movable supporting guide therefor, means acting on the guide to overbalance the saw frame to lift the saw from the work during the non-cutting stroke, means acting in opposition to the overbalancing means to feed the saw to its work during the cutting stroke and means for limiting the lifting movement of the saw.

2. Feeding means for power hack saw machines comprising, in combination, a reciprocating saw frame, a vertically movable supporting guide therefor, means acting on the guide to overbalance the saw frame to lift the saw from its work during the non-cutting stroke, a cam controlled lever, a feed dog carried by the lever, a ratchet member operatively associated with said supporting guide, for operative engagement by the dog and a check device for limiting the lifting movement of the saw.

3. Feeding means for power hack saw machines comprising, in combination, a reciprocating saw frame, a vertically swingable supporting guide therefor, means acting on the guide to overbalance the weight of the saw frame and the forward end of the guide to lift the saw from its work, a ratchet member operatively associated with the saw supporting guide, a cam controlled lever, a feed dog mounted on the lever to engage the ratchet member during the cutting stroke of the saw to press the saw toward its work and adapted to be released from the ratchet member during the non-cutting stroke of the saw, and a locking dog to engage the ratchet when the feed dog is released to limit the rising movement of the supporting guide under the action of said overbalancing means.

4. Feeding means for power hack saw machines comprising, in combination, a reciprocating frame, a vertically movable supporting guide therefor, means acting on the guide to overbalance the weight of the saw frame and the forward end of the guide to lift the saw from its work, a ratchet member operatively associated with the saw supporting guide, a cam controlled lever, a feed dog mounted on the lever to engage the ratchet member during the cutting stroke of the saw to press the saw toward its work and adapted to be released from the ratchet member during the non-cutting stroke of the saw, a locking dog to engage the ratchet member when the feed dog is released to limit the rising movement of the supporting guide under the action of said overbalancing means, and a throw-out device having means to simultaneously act upon both dogs to release them from said ratchet member.

5. Feeding means for power hack saw machines comprising, in combination, a reciprocating saw frame, a vertically movable supporting guide therefor, means acting on the guide to overbalance the weight of the saw frame and the forward end of the guide to lift the saw from its work, a ratchet member operatively associated with the saw supporting guide, a cam controlled lever, a feed dog mounted on the lever to engage the ratchet member during the cutting stroke of the saw to press the saw toward its work and adapted to be released from the ratchet in the non-cutting stroke of the saw, a locking dog to engage the ratchet member when the feed dog is released to limit the rising movement of the supporting guide under the action of said overbalancing means and a rock shaft mounted in the machine and provided with a throw-out arm to engage said dogs, with means to rock said shaft.

6. Feeding means for power hack saw machines comprising, in combination, a reciprocating saw frame, a vertically movable supporting guide therefor, means acting on the guide to overbalance the weight of the saw frame and the forward end of the guide to lift the saw from its work, means acting in opposition to said overbalancing means to positively feed the saw to its work during its cutting stroke and to be released from the saw during its non-cutting stroke, locking means to limit the rising movement of the saw during its non-cutting stroke, and means to limit the rising movement of the supporting guide when the feeding means and locking means are released from the saw.

7. A power hack saw machine comprising, in combination, a saw frame, its vertically movable supporting guide, a power shaft on which said guide is pivoted, a controlling cam mounted on said shaft, operative connection between the said shaft and saw frame for reciprocating the latter, a lever pivoted between its ends to the machine and carrying at one end a bearing member to engage the periphery of said cam, means tending to urge the bearing roller toward the cam, a ratchet member operatively associated with the supporting guide, a feed dog carried by the other end of said lever and coöperating with the ratchet member to feed the saw to its work, means acting on the supporting guide to overbalance the weight of the saw frame and the forward end of the guide when the feed dog is released and means coöperating with said ratchet member for limiting the upward movement of the guide and saw frame when the feed dog is so released.

8. A power hack saw machine comprising a power shaft, a reciprocating saw frame, a supporting guide for the frame pivoted to said shaft, overbalancing means acting on said guide to lift the saw from its work, operative connections between said shaft and saw frame to reciprocate the latter, a cam on said shaft, a lever pivoted between its ends to the machine frame, and carrying at its forward end a feed dog, a ratchet member operatively associated with said supporting guide and coöperating with the feed dog to feed the saw to its work against the action of said overbalancing means, a bearing member carried by the rear end of said lever for engagement with said cam, means tending to urge said bearing member toward the cam, said cam being shaped to permit the feed means to act on the rear end of the lever and depress the dog during the cutting stroke of the saw, and to release the feed dog from the ratchet member during the non-cutting stroke of the saw.

9. Feeding means for power hack saw machines, comprising in combination, a frame normally overbalanced away from the work, and feeding means comprising a ratchet member associated with the saw frame, a feed dog coöperating with the ratchet member to feed the saw toward the work and a stop dog also coöperating with the ratchet to limit the movement of the saw away from the work.

10. Feeding means for power hack saw machines, comprising in combination, a frame normally overbalanced away from the work, and feeding means comprising an endless ratchet, a drum associated therewith, a cable connecting the drum to the saw frame, a feed dog operatively engaging the ratchet to feed the saw to its work, and a stop dog coöperating with the ratchet to hold the saw frame from rising when the feed dog is released.

11. A power hack saw machine comprising a swinging saw frame and its guide, a shaft on which said guide is pivoted, said guide provided with a tail piece extension, a spring applied to the tail piece extension to overbalance the saw frame and guide away from the work, a cam-controlled, yieldingly actuated feed device for feeding the saw to its work, and a check dog to limit the raising of the saw frame when the feed device is released.

12. A power hack saw machine comprising a swinging saw frame and its guide, a shaft on which said guide is pivoted, said guide provided with a tail piece extension, a spring applied to the tail piece extension to overbalance the saw frame and guide away from the work, adjusting means to vary the overbalancing force of said spring, a cam-controlled, yieldingly actuated feed device for feeding the saw to its work, and a check dog to limit the raising of the saw frame when the feed device is released.

13. A power hack saw machine comprising a swinging saw frame and its guide, a shaft on which said guide is pivoted, said guide provided with a tail piece extension, overbalancing means for the saw frame and guide acting on said tail piece extension, a ratchet member associated with said guide, a feed dog coöperating therewith to feed the same toward the work, a cam controlled lever carrying said dog, a spring acting on said lever to move the feed dog through its feed stroke and a check dog acting on said ratchet member to limit the movement of the saw away from the work.

14. A power hack saw machine comprising a swinging saw frame and its guide, a shaft on which said guide is pivoted, said guide provided with a tail piece extension, overbalancing means for the saw frame and guide acting on said tail piece extension, a ratchet member associated with said guide, a feed dog coöperating therewith to feed the same toward the work, a cam controlled lever carrying said dog, a spring acting on said lever to move the feed dog through its feed stroke, a check dog acting on said ratchet member to limit the retiring movement of the saw and adjusting means to vary the force of the feed dog actuating spring.

15. A power hack saw machine comprising a shaft, a swinging saw frame guide pivoted to the shaft and formed with a rearwardly extending tail piece, a rod connected to the tail piece, a spring surrounding the rod and interposed between an abutment on the machine frame and a shoulder on the lower end of the rod, means acting on the saw frame guide in opposition to the overbalancing action of said spring to feed the saw to the work, and check means acting to limit the rising of said guide when the feed means is released.

16. A power hack saw comprising a swinging saw frame guide normally overbalanced away from the work, a shaft on which the guide is pivoted, a ratchet member associated with said guide, a controlling cam, a lever pivoted between its ends and bearing at one end against the controlling cam, a feed dog carried by the other end of said lever, a spring acting on the bearing end of said lever to press it toward said cam and to thereby swing the feed dog through a feed stroke, and a check dog coöperating with said ratchet member to limit the movement of the saw away from its work.

17. A power hack saw comprising a swinging saw frame guide normally overbalanced away from the work, a shaft on which the guide is pivoted, a ratchet member associated with said guide, a controlling cam, a lever pivoted between its ends and bearing at one end against the controlling cam, a feed dog carried by the other end of said lever, a spring acting on the bearing end of said lever to press it toward said cam and to thereby swing the feed dog through a feed stroke, a check dog coöperating with said ratchet member to limit the movement of the saw away from its work, and adjusting means to vary the force of the spring.

18. A power hack saw comprising a swinging saw frame guide normally overbalanced away from the work, a shaft on which the guide is pivoted, a ratchet member associated with said guide, a controlling cam, a lever pivoted between its ends and bearing at one end against the controlling cam, a feed dog carried by the other end of said lever, a rod connected with the bearing end of said lever, a spring surrounding the rod and bearing at one end against a shoulder on the rod, an adjusting lever perforated for the passage of said rod therethrough and bearing against the other end of said spring, with means to lock the adjusting lever in adjusted positions and a check dog coöperating with said ratchet member to limit the movement of the saw away from its work.

In testimony that I claim the foregoing as my invention I affix my signature in the presence of two witnesses, this 1st day of February, A. D. 1916.

ANDREW RASMUSSEN.

Witnesses:
   W. L. Hall,
   Irene Forrest.